(12) United States Patent
Wu et al.

(10) Patent No.: US 11,511,508 B2
(45) Date of Patent: Nov. 29, 2022

(54) PROCESS OF MANUFACTURING THICKENED ANGLE RING

(71) Applicant: Liaoning Xingqi Electric Material Limited Liability Company, Liaoyang (CN)

(72) Inventors: Dongyang Wu, Liaoyang (CN); Dandan Li, Liaoyang (CN); Shangyuan Huo, Liaoyang (CN); Jin Dai, Liaoyang (CN); Liang Shi, Liaoyang (CN)

(73) Assignee: LIAONING XINGQI ELECTRIC MATERIAL LIMITED LIABILITY COMPANY, Liaoning (CN)

( * ) Notice: Subject to any disclaimer, the term of this patent is extended or adjusted under 35 U.S.C. 154(b) by 184 days.

(21) Appl. No.: 17/137,242

(22) Filed: Dec. 29, 2020

(65) Prior Publication Data
US 2021/0379879 A1 Dec. 9, 2021

(30) Foreign Application Priority Data

Jun. 7, 2020 (CN) .......................... 202010509078.1

(51) Int. Cl.
*B31D 5/00* (2017.01)
*D21J 1/12* (2006.01)
*B32B 27/10* (2006.01)
*B32B 27/36* (2006.01)
*B32B 29/00* (2006.01)
*B32B 37/18* (2006.01)
(Continued)

(52) U.S. Cl.
CPC ................. *B31D 5/00* (2013.01); *B31D 5/02* (2013.01); *B32B 27/10* (2013.01); *B32B 27/36* (2013.01); *B32B 29/005* (2013.01); *B32B 37/18* (2013.01); *B32B 38/0012* (2013.01); *D21J 1/12* (2013.01); *B32B 37/10* (2013.01); *B32B 2309/02* (2013.01); *B32B 2309/12* (2013.01); *B32B 2317/12* (2013.01); *B32B 2367/00* (2013.01); *B32B 2377/00* (2013.01); *B32B 2597/00* (2013.01)

(58) Field of Classification Search
CPC ........ B31D 5/00; B31D 5/02; B32B 2317/12; D21J 3/12
See application file for complete search history.

(56) References Cited

FOREIGN PATENT DOCUMENTS

KR  2009 0053757 A  *  5/2009  ............... B31D 5/04
KR  2017 0028500 A  *  3/2017  ........... H01F 27/323

OTHER PUBLICATIONS

Yang et al., Synthesis mechanism of carbon microsphere from was office paper via hydrothermal method, 2022, BioResources 17(4), 5568-5577. (Year: 2022).*

* cited by examiner

*Primary Examiner* — Anthony Calandra
(74) *Attorney, Agent, or Firm* — FisherBroyles, LLP

(57) ABSTRACT

Disclosed is a process of manufacturing a thickened angle ring. The process includes the steps of: soaking wet paper into deionized water for 1 hour; beating bonding surfaces of the two pieces of wet paper into fuzzed and rough surfaces; placing a heat resisting polyester film and a nylon net on a mold, and placing one fuzzed wet paper on the mold in contact with the nylon net on smooth side thereof; placing the other wet paper in contact with the fuzzed surface of the previous wet paper on fuzzed side thereof, and beating until the wet paper fits the mold; placing a further heat resisting polyester film and a further nylon net on the two pieces of wet paper for pressing.

1 Claim, 1 Drawing Sheet

(51) Int. Cl.
 *B32B 38/00* (2006.01)
 *B31D 5/02* (2017.01)
 *B32B 37/10* (2006.01)

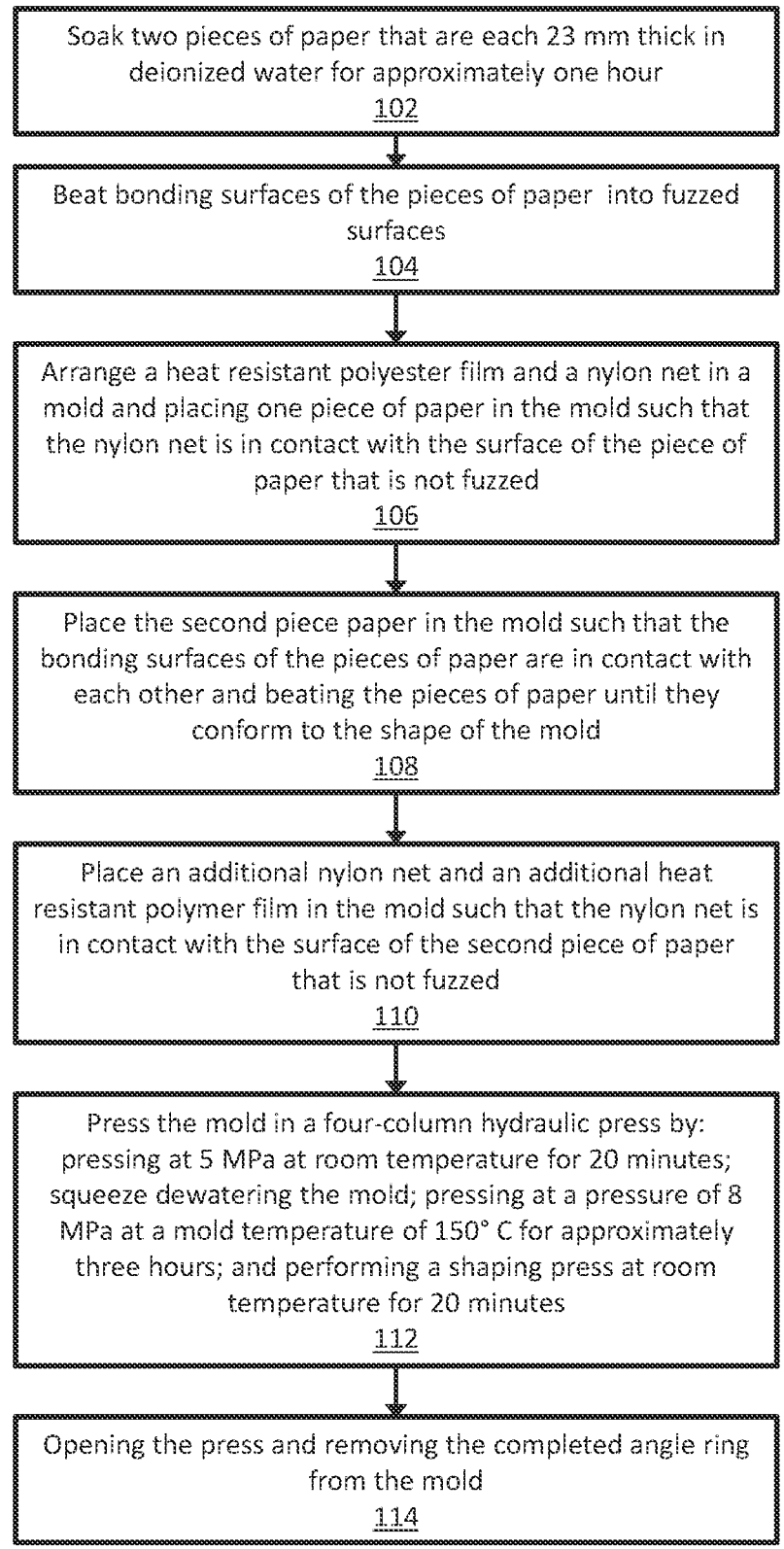

PROCESS OF MANUFACTURING THICKENED ANGLE RING

CROSS-REFERENCE TO PRIORITY APPLICATION

This application claims priority to Chinese Application No. 202010509078.1 which was filed on Jun. 7, 2020, the entire contents of which are incorporated herein by this reference.

TECHNICAL FIELD

The present disclosure relates to a process of manufacturing a thickened angle ring.

BACKGROUND

According to an existing process of manufacturing a thickened angle ring, an angle ring is manufactured by directly heating and pressing wet paper placed on a mold. In this case, the angle ring may be heavily delaminated in the middle and thus poor in quality.

BRIEF DESCRIPTIONS OF THE DRAWINGS

The accompanying drawing illustrates an example process applying the concepts discussed in the instant disclosure. Together with the following description, this drawing demonstrates and explains various principles of the instant disclosure.

The FIGURE is a flow diagram showing a process for manufacturing thickened angle rings.

While the exemplary embodiments described herein are susceptible to various modifications and alternative forms, a specific embodiment has been shown by way of example. However, the exemplary embodiment described herein is not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawing and claims.

SUMMARY

The technical problem to be solved by the present disclosure is to provide a process of manufacturing a thickened angle ring that can effectively solve the problem of middle delamination of an angle ring and thereby improve the quality of the product.

The described objective is achieved by the following steps:

1. Wet paper having the thickness of 23 mm may be soaked into deionized water for about 1 hour, and the soaked wet paper may be taken out until the wet paper is medium soft inside and outside.

2. Bonding surfaces of two pieces of wet paper needed in pressing may be beaten such that the surfaces are fuzzed and become rough.

3. A heat resisting polyester film and a nylon net may be placed on a mold, and one fuzzed wet paper may be placed on the mold in contact with the nylon net on smooth side thereof. The other wet paper may be placed in contact with the fuzzed surface of the previous wet paper on fuzzed side thereof, and then the two fuzzed surfaces in contact with each other may be beaten until they fit the mold. A further heat resisting polyester film and a further nylon net may be placed on the two well-placed pieces of wet paper for pressing.

4. A pressing machine involved in pressing may be a four-column hydraulic press. Pressing may be performed first under the pressure of 5 MPa at room temperature for 20 minutes, followed by squeeze dewatering. Pressing may be performed then under the pressure of 8 MPa at mold temperature increased to about 150° C. for 3 hours, and then cold pressing may be performed for shaping at mold temperature reduced to room temperature for 20 minutes.

5. After all the described pressing procedures are completed, the press may be lifted up to take out the angle ring.

Advantages of the present disclosures: the squeeze dewatering before pressing and later shaping at room temperature can result in perfect removal of water in thickened wet ground paper, thereby preventing the middle delamination of an angle ring and improving the quality of the product.

DETAILED DESCRIPTION

1. Two pieces of 23 mm thick wet paper may be soaked into deionized water for about 1 hour, and the soaked wet paper may be taken out until the wet paper is medium soft inside and outside.

2. Bonding surfaces of two pieces of wet paper needed in pressing may be beaten such that the surfaces are fuzzed and become rough.

3. A heat resisting polyester film and a nylon net may be placed on a mold, and one fuzzed wet paper may be placed on the mold in contact with the nylon net on smooth side thereof. The other wet paper may be placed in contact with the fuzzed surface of the previous wet paper on fuzzed side thereof, and then the two fuzzed surfaces in contact with each other may be beaten until they fit the mold. A further heat resisting polyester film and a further nylon net may be placed on the two well-placed pieces of wet paper for pressing.

4. A pressing machine involved in pressing may be a four-column hydraulic press. Pressing may be performed first under the pressure of 5 MPa at room temperature for 20 minutes, followed by squeeze dewatering. Pressing may be then performed then under the pressure of 8 MPa at mold temperature increased to about 150° C. for 3 hours, and then cold pressing may be performed for shaping at mold temperature reduced to room temperature for 20 minutes.

5. After all the described pressing procedures are completed, the press may be lifted up to take out the angle ring.

What is claimed is:

1. A process of manufacturing a thickened angle ring, the process comprising:
    soaking a first piece of paper and a second piece of paper in deionized water for approximately one hour wherein the first piece of paper and the second piece of paper are each 23 mm in thickness;
    beating a bonding surface of the first piece of paper and a bonding surface of the second piece of paper into fuzzed surfaces;
    arranging a heat resistant polyester film and a nylon net in a mold and placing the first piece of paper in the mold such that the nylon net is in contact with the surface of the first piece of paper that is not fuzzed;

placing the second piece of paper in the mold such that the bonding surface of the second piece of paper is in contact with the bonding surface of the first piece of paper, and beating the exposed surface of the second piece of paper until the first piece of paper and the second piece of paper conform to the shape of the mold;

placing an additional nylon net and an additional heat resistant polyester film in the mold such that the nylon net is in contact with the surface of the second piece of paper that is not fuzzed;

pressing the mold in a four-column hydraulic press by:
   performing a first press at a pressure of 5 MPa at room temperature for 20 minutes;
   squeeze dewatering the mold;
   performing a second press at a pressure of 8 MPa at a mold temperature of 150° C. for approximately three hours; and
   performing a shaping press at room temperature for 20 minutes; and opening the hydraulic press and the mold to remove a completed angle ring from the mold.

\* \* \* \* \*